March 29, 1960 W. H. BLASHFIELD 2,930,853
DISTRIBUTOR ARRANGEMENT
Filed Aug. 13, 1957
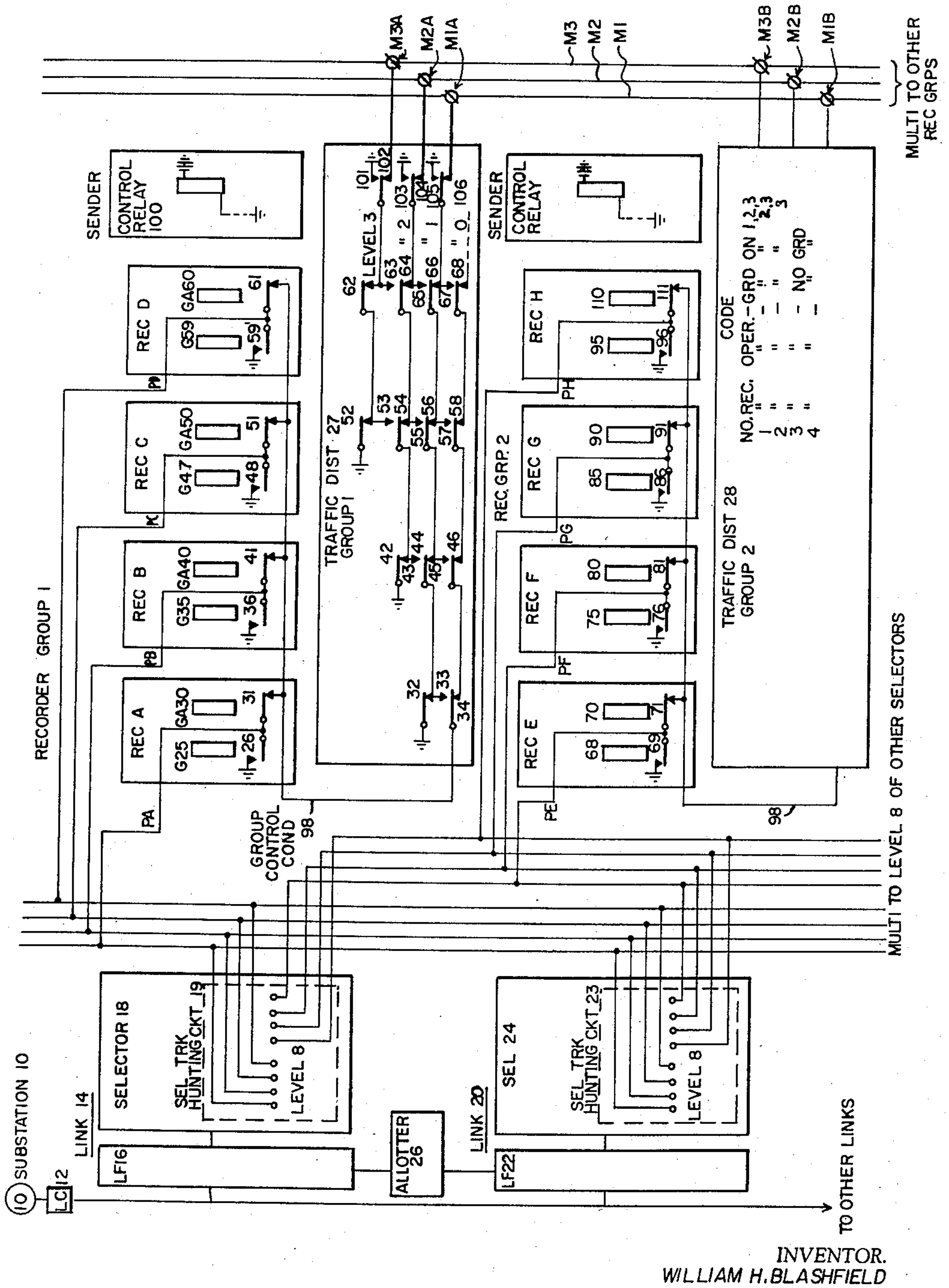
INVENTOR.
WILLIAM H. BLASHFIELD
BY Brown Jackson Boettcher & Dienner United States Patent Office 2,930,853
Patented Mar. 29, 1960

2,930,853

DISTRIBUTOR ARRANGEMENT

William H. Blashfield, Galion, Ohio, assignor to North Electric Company, Galion, Ohio, a corporation of Ohio Application August 13, 1957, Serial No. 677,950

10 Claims. (Cl. 179—18)

The present invention relates in general to a novel distributor arrangement for use in providing optimum distribution of working loads between different groups of units in a control system, and, particularly, to a novel distributor arrangement for use in providing an optimum distribution of traffic between a plurality of groups of automatic switches in an automatic telephone system.

The use of distributor or allotter circuits for the purpose of preselecting or preassigning certain units for operation in a control system has been extensively practiced over the years in automatic telephony, telegraphy, railroad signaling, and other similar fields. In telephone exchanges, for example, the automatic switches which are used to establish connections between the subscribers of the exchange, as well as to subscribers of other exchanges, must, for reasons of economy, be shared commonly by the subscribers. Such systems are therefore conventionally provided with special allotter or distributor equipment which prepares the switches for use by the subscribers according to a predetermined pattern. In the establishment of a conventional connection to a desired subscriber, for example, an idle linefinder-selector link which has been preselected by an allotter circuit is immediately connected to the line of the calling subscriber as soon as his receiver is removed from his handset, and in response thereto, the allotter equipment immediately locates and prepares another idle linefinder-selector link for use by the next calling subscriber. Other allotter and distributor equipment in the exchange operates in a similar manner to preassign recorders, trunks, etc., for use by the subscribers in the establishment of a connection.

It is a particular object of the present invention to provide an allotter or traffic distribution system for use in arrangements of this general type which is extremely economical in construction, and which may be incorporated in existing systems by the addition of a comparatively few number of relay members.

It is a specific object of the present invention to provide a traffic distributor system of these advantages and features which is adapted for use in providing more efficient and uniform traffic distribution, and which is sufficiently flexible to permit the use thereof in accomplishing most types of allotting and distributing functions.

These and other features of the invention will become apparent with reference to the following specification and drawings in which Figure 1 illustrates in block form the novel distributor circuit arrangement of the invention and its manner of connection in allotting recorder groups of a toll ticketing system for use according to a predetermined pattern.

*General description*

The novel distributor system, for exemplary purposes, is illustrated in conjunction with a toll ticketing system of the type set forth in the copending application of Wm. H. Blashfield et al. which was filed July 15, 1953, and was assigned Serial No. 368,066. The system thus described basically includes a group of automatic telephone exchanges, each of which includes automatic switching equipment for the purpose of providing the completely automatic extension of calls between the subscribers in an exchange and also between local subscribers and subscribers of a remote exchange. Toll ticketing equipment is included in certain of the exchanges, such as recorder exchange A shown therein, for the purpose of recording data concerning the calls established by the subscribers in the recorder office to the subscribers of other exchanges, and the calls established by subscribers of preassigned ones of the nonrecorder offices to other exchanges. Recorder circuit 225 shown therein, for example, provides a tape record of information concerning the called exchange number, the number of the calling party, the number of the called party, the calling exchange number and the time and duration of the connection established. The recorder circuit 225 also controls extension of the connection in the direction of the desired exchange, and cooperates with its associated sender in the verification of the calling party number and, in certain cases, in the transmission of routing signals over the selected one of the outgoing trunks.

Each recorder is occupied for the duration of a call whereas its associated sender is occupied only briefly during the setting up of the call. Therefore, fewer senders than recorders are needed in an office, an economical means of association is to divide the recorders into groups with one sender assigned exclusively to each recorder group (i.e. shared control) but shared control has certain limitations in traffic handling ability compared to "common control" in which each sender would be available to every recorder in the office. While a recorder and its associated sender are occupied in setting up a call, obviously the sender is not available to the other recorders in the group and means must be provided to prevent these other recorders from receiving calls during this interval.

Further it is apparent that if all the recorders in a group are occupied with calls that have been set up, the associated sender is idle, but in the "shared control" system such sender is not available to other recorder groups. Therefore it is desirable to include some means in the system for distributing the traffic as equally as possible among recorder groups so that idle recorders will be distributed among different groups and associated senders will be maintained available.

The novel allotter system of the present invention is disclosed in such environment and particularly in its use in the assignment of idle recorders in the different groups for use by subscribers according to a preferred pattern which provides a more even load distribution. In the preferred pattern, the allotter equipment receives a constant indication of the number of recorders which are busy in each group and constantly prepares for use the idle recorders in the one of the groups which has the smallest number of recorders in use at the time.

In the present illustrated example, the recorders of the exchange are divided into groups of four, it being readily apparent from the disclosure hereafter, however, that any desired number of recorders may be included in each group. According to the invention, marking means are associated with each group of recorders which provide an indication at all times of the number of recorders in the group which are in the busy condition. The indications thus provided are coupled to a multiple marking arrangement which by reason of its connection to the individual marking means for each group provides an indication of the least number of recorders in use in any of the groups.

The individual marking means for each group in their connection to such multiple, in turn, provide a continuous indication to its associated group of recorders as to whether another group of recorders has a smaller number of recorders in use. Whenever such signal to a group indicates that another group of recorders has a smaller number of recorders in use than its own group, the signal is further extended to the exchange switches which have access to the recorder groups to render the group having the greater number of recorders in use busy to the associated switches. Such manner of operation has many distinct and obvious advantages, and the manner in which such operation is effected by a comparatively simple and economical structural arrangement is now disclosed herein.

*General operation*

The operation of the novel allotter system is exemplified in the consideration hereinafter of the manner in which a connection is initiated by a calling subscriber in the direction of a subscriber in a distant exchange. In that the specific switches of the automatic telephone exchange schematically illustrated herein have been set forth in detail in the above identified copending application, the description of the switches and their operation in effecting extension of the connection herein is limited to that portion which is concerned with the extension of the call from the calling substation to the recorder groups, and the manner in which the allotter equipment effects the desired assignment of the recorder groups for use.

With reference now to the drawing, it is apparent that in the initiation of a call to a subscriber in the distant exchange, the calling subscriber at substation 10 removes his receiver from the switch hook thereat, and line circuit 12 associated therewith responsively engages an idle finder-selector link, such as one of the illustrated links 14, 20, etc., which has been previously assigned for use by a common link selector allotter, such as illustrated allotter 26.

Assuming that finder-selector link 14 is idle, and that such link has been preassigned by the link allotter 26 for use in the establishment of the connection, the linefinder switch 16 in link 14 operates to select the calling line and to connect same to the associated selector switch 18. As the calling line is seized and extended by way of linefinder switch 16 to the associated selector switch 18, the line is marked as busy in all of the connector switches of the links having access thereto. The linefinder-selector link 14 is now prepared for operation in response to impulses which are transmitted by the subscriber's substation dial.

In accordance with the disclosure of the above-identified copending application, it is assumed for exemplary purposes that the code number of the distant exchange having the desired subscriber is 81. As the subscriber now dials the digit 8, the selector switch 18 of the seized link 14 is operated to the eighth level.

When the selector 18 has responsively advanced to the eighth level, it operates in conventional manner to test the P-wires of the recorders connected thereto for the idle and busy condition of the recorders which are accessible to the selector over such level (recorders A–H in the illustrated arrangement) and selects one of the idle recorders.

*Traffic distributor arrangement*

According to the invention, a novel traffic distributor arrangement is connected in the telephone system for the purpose of effecting an optimum distribution of traffic over the recorders which are accessible to the links. In the illustrated arrangement, the eight recorders A–H are assigned in a divided manner to group 1 and group 2, respectively, each group having four recorders each. It will be apparent hereinafter that the number of groups and the number of recorders in a group may be varied in accordance with the nature of the installation.

The recorders A–H are of the general type set forth in the above identified copending application. As shown therein, each recorder includes an associated P-wire (test conductor), such as $P_A$, $P_B$, etc., connected to an individual terminal on the eighth level of each of the selectors of the links having access thereto. In accordance with one conventional system in the field, a recorder places ground on its P-wire whenever the recorder is in use, and an absence of ground thereon is used to indicate to the selector that the recorder is idle. Thus the selector searches for a terminal having no ground thereon, and with the location of same, effects the selection of such recorder.

Each recorder, in accordance with conventional practice, is equipped with a so-called "hold relay" and an associated "slave relay," which are identified in recorder A in Figure 1 as relays G25 and GA30, respectively (see hold relay 525 and slave relay 530 respectively in recorder 225 of the copending application). In addition to providing holding ground for its associated recorder when seized for use, hold relay G25 is effective at contacts 26 to connect ground to the P-wire which extends back to the selector multiple to indicate that the recorder is now in use (i.e. busy).

A feature of the invention is the manner in which the existing equipment is modified by the simple addition of one relay per sender (control relay 100 more fully described hereinafter) and a contact pileup to the slave relay, such as GA30, in each recorder to provide the novel traffic distributor system. More specifically, each traffic distributor, such as 27, basically comprises a series of levels, such as illustrated levels 0–3 which are used for marking and allotting purposes, and a set of marking means comprising contact pileups which are added to the slave or signal relays, such as GA30 for each recorder in the group, and which are connected to control the markings and circuits which are extended thereover. Thus, slave hold relay GA30 in recorder A is equipped with additional contacts 31–34; relay GA40 in recorder B is equipped with additional contacts 41–46; relay GA50 in recorder C is equipped with additional contacts 51–58; and relay GA60 in recorder D is equipped with additional contacts 61–67. The slave hold relays GA70–100 in the second group of recorders are similarly equipped.

The purpose of the contacts thus arranged in the traffic distributors for group 1 and group 2 is to indicate over the levels 1, 2 and 3 via corresponding marking terminals to a set of marking conductors, or multiple members, "M1," "M2," and "M3," which are multipled to similar terminals in all of the traffic distributors of the system, the number of recorders in its associated group which are in the busy condition. The traffic distributor, in addition to supplying such information to the multiples "M1," "M2," and "M3," receives information back from those leads to a group control lead, such as 98, to the recorders of the group to indicate either that some other group contains a smaller number of busy recorders, or alternatively that no other group contains a smaller number of busy recorders. If the recorder group contains a larger number of busy recorders than any other recorder group, the ground markings placed on the multiple marking conductors M1–M3 by the recorder group having a smaller number of busy recorders will be extended by the traffic distributor for the group over one of its levels to associated group control conductor 98, which is in turn multipled over contacts such as 31, 41, 51, 61 on each recorder slave relay GA30, to the P-wire for such recorder. Such ground thus provides an "artificial" indication to the selectors having access to such recorder group that each recorder therein is busy, and the selector will proceed accordingly to the recorder group having the smaller number of recorders in use. It will be observed relative to traffic distributor 27 that levels 1, 2. and 3 extend to the right through break contacts of relay 100 to corresponding terminals M1A, M2A, and M3A which are connected to multiple conductors M1, M2, and M3; and relative to traffic distributor 28 that levels 1, 2, and 3 extend to the right through break contacts of a control relay corresponding to relay 100 to corresponding terminals M1B, M2B, and M3B which are also connected to multiple conductors M1, M2, and M3.

The specific manner in which the allotter function is accomplished by such distributor is now set forth.

*Specific traffic distributor description*

For purposes of illustration, the following marking is used by the traffic distributors to indicate to the multiple conductors M1, M2, M3 the number of recorders which are busy in their associated group, and the readout conductor 98 is shifted as set forth in the following chart:

CONNECTION OF MARKING SIGNALS AND READOUT CONDUCTOR 98 TO MULTIPLES

| Marking Lead | No Recorders Busy | One Recorder Busy | Two Recorders Busy | Three Recorders Busy | Four Recorders Busy |
|---|---|---|---|---|---|
| M3 | GND | GND | GND | Readout [1] | |
| M2 | GND | GND | Readout [1] | | |
| M1 | GND | Readout [1] | | | |

[1] Readout conductor 98.

The pattern of arrangement of the contacts in the traffic distributor will, of course, vary with the number of recorders in the group and may be derived from the pattern set forth in the present disclosure. Briefly, with four recorders in a group (see group 1 for example), the traffic distributor contacts are arranged to supply information over three output levels 1, 2 and 3 respectively, via marking terminals M1A, M2A, and M3A to the three multiple leads "M1," "M2," and "M3," that one, two and three recorders in the group are in use. (Ground, contacts 32, 44, 56, 66, level 1, contacts 106, terminal M1A, conductor M1) (ground, contacts 42, 54, 64, level 2, contacts 104, terminal M2A, conductor M2) (ground, contacts 52, 62, level 3, contacts 102, terminal M3A, conductor M3). Thus with no recorders of a group busy, a ground signal is normally extended to multiple conductors M1, M2, M3 to indicate such condition to the other groups. It is also noted that the "readout" or group control conductor 98 is not connected to any of the multiple conductors if none of the recorders are in use since if no recorders in a group are busy, obviously no other group can have a smaller number of busy recorders, and there is no need to connect the readout conductor 98 to the multiple for the purpose of making such test. With no recorders busy, no ground appears on the P-wire of any of the recorders of such group, and the recorders of the group are available for seizure by the selector equipment.

As soon as any one of the recorders of a group, such as recorder A in group 1, is seized by a selector for use in establishing a connection to a distant subscriber, the hold relay, such as G25 in recorder A and auxiliary slave relay, such as GA30, in recorder A operate. The associated sender is seized in turn by the recorder, and sender relay 100 operates (relays G25, 100 and GA30 operate in the order given). At the time recorder A is seized, ground from the selector P-wire on conductor $P_A$ is carried through contacts 31 and through corresponding contacts 41, 51, and 61 to the P-wires $P_B$, $P_C$, and $P_D$ to busy, these recorders to the selector multiple. Such circuit is broken by contacts 31 when relay GA30 operates, but prior to this time relay 100 will have operated. Sender relay 100 at its break contacts 102, 104, and 106 disconnects traffic distributor 27 from multiple leads M0, M1 and M2, and at its make contacts 101, 103, and 105 applies ground through contacts of relays GA30 to GA60 to lead 98. Such ground continues, through break contacts of the GA relays in the idler recorders (such as contacts 41, 51, and 61) to the respective P-wires, such as $P_B$, $P_C$, and $P_D$ so that these recorders will test busy to calling selectors. Obviously these idle recorders cannot be permitted to receive calls while the associated sender is in use.

After the sender has finished setting up the call, it releases, dropping relay 100 which reconnects multiple conductors M0, M1, and M2 to the contacts of traffic distributor 27; recorder A remaining busy during the conversation.

In such operation, the seized one of the recorders (recorder A in the exemplary disclosure) advances the marking output of the traffic distributor one level; that is, the traffic distributor 27 now removes ground from level one to indicate to the multiple that one recorder in its group is in use (ground remaining on M2, M3) and advances the readout conductor 98 to level one (and multiple M1) for the purpose of determining whether another recorder group has less than one recorder in use (i.e., if all the recorders in another group are idle, the traffic distributor for such group will indicate such condition to the multiple by placing ground on marking conductors M1, M2, and M3, and readout conductor 98 will find the marking ground on multiple conductor M1. Such ground is extended by group control conductor 98 over the P wires for the recorders to the selectors to busy same to the selectors as hereinbefore described).

The circuit for effecting the advancement of marking output one level in this manner will of course depend upon the particular recorder which is first operated. Thus, if recorder A is the first recorder to be operated, contacts 32 are opened and ground is removed from the marking output of level 1 and conductor "M1," to thereby advance the marking ground one level to indicate to the multiple that there is one operated recorder in the first recorder group. Simultaneously contacts 33 are closed to advance the readout conductor 98 one level by connecting readout conductor 98 over contacts 33, 44, 56 and 66 to level 1 and through contacts 106 and terminal M1A to marking conductor "M1."

In the event recorder B is operated first, contacts 44 interrupt the ground connection to the marking output terminal M1A for level 1 and conductor "M1" and contacts 45 connect the readout conductor 98 to the marking output terminal M1A for level one and multiple conductor M1. At this time the marking ground for the output terminal M2A for level 2 is also shifted to a new circuit by the opening of contacts 42 and the closure of contacts 43, the marking circuit now extending from ground over contacts 32, 43, 54, and 64. The manner in which the operation of recorder C alone or recorder D alone will effect advancement of the traffic distributor one level, and simultaneously re-establish new paths for marking conductors "M2" and "M3" will be obvious from the foregoing description.

In the event that two recorders become busy the traffic distributor will be advanced one additional level, and in such condition marks the multiple to show that two recorders of its group are in use by removing the ground signal from the marking terminal M2A for level 2 (and multiple conductor M2), whereby ground is maintained on marking conductor "M3" alone. Simultaneously the traffic distributor advances readout conductor 98 to the output terminal M2A for level 2 and conductor "M2." If any other group of recorders has less than two recorders busy, its traffic distributor will apply ground to conductors "M2" and "M3," and the ground on "M2" will be extended over the second level to readout conductor 98 in the first group, busying the idle recorders in group 1.

More specifically, assuming that recorders B and D of group 1 are busy, the ground for the marking output terminal M1A for level 1 (and conductor "M1") will be opened at contacts 44 and 66; the ground for the marking output terminal M2A for level 2 and conductor "M2" will be interrupted by open contacts 42, 64; and the ground for the marking output terminal M3A for level 3 and conductor "M3" will now be applied over the circuit extending from ground over contacts 32, 43, 54 and 63, level 3, contacts 102, and terminal M3A to marking conductor "M3." Simultaneously the group readout control conductor 98 is connected to the output terminal for level 2 and marking conductor "M2" over a circuit extending over contacts 65, 56, 45, and 34, whereby with an indication by the traffic distributor of any other group that it has less than two recorder in use (ground on conductors M2 and M3) the ground on conductor M2 will busy the recorders of the first group to the selector equipment.

The manner in which ground is extended only to marking conductor "M3" and in which readout conductor 98 is connected to level 2 and marking conductor "M2" whenever any two recorders of a group are operated will be apparent from such description.

Assuming now that three recorders are busy, the traffic distributor will be advanced one more level, and in such condition marks the multiple to show that three recorders of the group are busy no ground is applied to conductors M1, M2 or M3 and group control conductor 98 is connected to the output terminal M3A for level 3 and conductor M3, so that if any other recorder group has less than three recorders busy, the ground it places on conductor "M3" will be extended over the third level marking terminal M3A to readout conductor 98 to busy the recorders of group 1.

Assuming, for example, that recorders A, C and D are in use, marking conductor "M1" will be open at contacts 66 and 58; conductor "M2" will be open at contacts 64 and 56; and conductor "M3" will be connected to readout conductor 98 over contacts 63, 55, 44, and 33. Accordingly, any ground on marking conductor "M3" from another group of recorders that has less than three recorders busy will mark readout conductor 98 in group 1 to busy the recorders therein to the selectors. Detailed consideration of the connections whenever three other recorders are operated (i.e., B, C, D; A, B, C) will show that ground in each case will be removed from each of the marking conductors M1, M2, and M3 and the readout conductor 98 will be connected to the marking terminal M3B for level 3 and marking conductor M3.

Briefly summarized, the information thus provided to the multiple marking conductors "M1," "M2" and "M3" by the traffic distributors for the different groups is analyzed by the same traffic distributors for the purpose of ascertaining whether another recorder group has a smaller number of busy recorders therein.

If all other recorder groups contain the same number or greater number of busy recorders than the first group, the first group is maintained available for use. If any other recorder group has a smaller number of busy recorders, the recorders associated with the first group are marked busy to the selectors.

The pattern of the contacts in arrangements which have a greater number of recorders in each group will be obvious from the foregoing disclosure. Basically, the traffic distributor has N levels and a series of N contact sets controlled by N recorders for normally connecting marking ground to $N-1$ output conductors designated $M_1$ to $M_{N-1}$. With the operation of each recorder, the contact set associated therewith raises the traffic distributor marking ground one more level, i.e. as the first recorder becomes busy, ground is removed from conductor M1 and the readout conductor 98 is connected to the terminal M1A for level 1. If "X" number of recorders become busy, the readout conductor 98 becomes connected to multiple conductor $M_x$ and all higher numbered multiple conductors become grounded.

As a result, any time one of the groups has a smaller number of recorders busy than any of the other groups, the readout conductors 98 of the other recorder groups will be connected to a marking conductor to which the marking ground of the one group is connected, and such marking ground will therefore have a path to the readout conductors of the other groups to render such groups busy to the selector equipment.

In the event that some groups contain fewer recorders than some other groups, the connections may be arranged to accommodate such condition. That is, if recorder D were absent in group 1, the wiring would be strapped across the make contacts (63, 65, 67) of GA60 to give the effect of the missing recorder being busy, so that group 1 would tend to stay one call behind other full groups and thus approach the all records busy condition at the same time.

It is apparent that the novel allotter circuit described herein may be modified while yet retaining the spirit of the invention. Thus slave relay GA30, etc., could be normally operated relays, so that if power was lost to a recorder, the recorder would appear busy.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. In an allotter system for assigning one of a plurality of different groups of units for use in accordance with the relative number of busy units therein, a traffic distributor means for each of said groups, each of which traffic distributor means includes a plurality of marking levels for extending signals over at least certain ones thereof to indicate the number of busy units in the group associated therewith, marking means in each traffic distributor means operative to establish a predetermined marking signal on each of said certain levels responsive to each unit in its associated group being in the idle condition and to advance the marking signals one level responsive to each operation of a unit of its group to a busy condition, and a plurality of multiple means each of which interconnects alike one of said certain levels in each of said traffic distributor means with each other, different multiple means interconnecting different levels, said marking means for each of said traffic distributor means being operative in said marking of its levels to mark said common multiple means to represent the total number of busy units in the one of the groups having the smallest number of busy units therein.

2. In an allotter system for assigning one of a plurality of different groups of units for use in accordance with the relative number of units therein which are in a first predetermined condition, a traffic distributor means for each of said groups, each of which includes a plurality of marking levels for extending signals over at least certain ones of said levels to indicate the number of units in said condition in the group associated therewith, marking means in each traffic distributor means operative to establish a predetermined marking signal on said certain levels responsive to none of the units in its associated group being in said condition and for changing the marking signal on a successive one of the levels in the sequence responsive to each operation of a unit of its group to said predetermined condition, and a plurality of common multiple means for interconnecting said certain levels of each traffic distributor means with the like levels in the other traffic distributor means, said marking signals connected to said common multiple means by said different traffic distributor means thus indicating thereon the total number of units in said predetermined condition in the ones of the groups having the smallest number of units in said predetermined condition.

3. In an allotter system for assigning one of a plurality of different groups of units for use in accordance with the relative number of units which are in a first predetermined condition therein, a traffic distributor means for each group including a plurality of marking levels for indicating over at least certain ones thereof the number of units in the group associated therewith which are in said condition, signal marking means in each traffic distributor means operative to establish a signal on each of said certain levels responsive to each unit in its associated group being in a second condition and for advancing the marking signals one level responsive to each operation of a unit of its group to said first condition, a plurality of multiple means for interconnecting like ones of said certain levels for each of the traffic distributor means, said signal marking means of the different distributor means being thus operative in the marking of their associated levels to mark on said multiples the total number of units in said first condition in the group having the smallest number of units in said first condition, readout means for each group, and means in each traffic distributor operative with said signal marking means to connect said readout means to a level below said certain levels and to advance the connection one level with each operation of a unit in its group to said first condition.

4. In an allotter system for assigning one of a plurality of different groups of N units for use in accordance with the relative number of units which are in a predetermined condition therein; a traffic distributor means for each group including a plurality of N marking levels for indicating over at least $N-1$ levels, the number of units in the group associated therewith which are in said condition, signal marking means in each traffic distributor means operative to establish a signal on each of said $N-1$ levels responsive to none of said units in its associated group being in said predetermined condition and for advancing the marking signals one level responsive to each operation of a unit of its group to said condition, and a plurality of common multiple means interconnecting like ones of said $N-1$ levels for each of the traffic distributor means with each other, whereby the signal markings on each of the levels are coupled to said common multiple means to indicate thereon the total number of units in said predetermined condition in the one of the groups having the smallest number of units in said condition.

5. In an allotter system for assigning different groups of switching units for use in accordance with the relative number of busy units therein, a traffic distributor means for each group including a plurality of marking levels for extending signals over at least certain of said levels to indicate the number of busy units in the group associated therewith, signal marking means in each traffic distributor means including means for placing a ground marking signal on each of said certain levels responsive to each unit in its associated group being in the idle condition and for removing the ground marking signals from a different successive one of said levels responsive to each operation of a unit of its group to a busy condition, a plurality of common multiple means each of which interconnects one level of said certain levels in each of the different traffic distributor means, different ones of the multiple means connecting different ones of the levels, whereby the total number of ground signals on said plurality of multiple means indicates the total number of units busy in the group having the smallest number of busy units therein, and a ground signal on all of said multiple means indicates each of the units of at least one group are in the idle condition; readout means for each traffic distributor; and means controlled by said signal marker means to connect said readout means to at least one level below said certain levels and to advance said readout means to successive levels simultaneously with advancement of said ground marking signals.

6. In an allotter system for assigning different groups of switching units for use in accordance with the relative number of busy units therein, a traffic distributor means for each group including a plurality of marking levels for extending signals over at least certain of said levels to indicate the number of busy units in the group associated therewith, signal marking means including a relay member for each unit of a group operative with selection of its associated unit for operation, a first contact set on each relay connected to control the application of signals to at least one of said levels, the relay member for successive units in the group having contacts for controlling the markings on a successively different number of said levels, the contacts on the relay for the last unit being connected to control the signals applied to the same levels as the relay for the second last unit of the group, said respective contact sets being connected to apply signals in combination to each of said certain levels responsive to each unit in its associated group being in the idle condition and to advance the marking signals one level responsive to each operation of any one of said relays in a unit of its group to a busy condition, and a plurality of multiple means, each of which is multipled to an associated one of the levels in each of the different traffic distributor means, whereby said markings on the levels of each distributor means are coupled to said multiple means and said plurality of multiple means indicate the total number of units busy in the group having the smallest number of busy units therein.

7. An allotter system as set forth in claim 6 which includes readout means for each group of units, and an additional contact set for each of said relays of a group operative to connect said readout means to a level below said certain levels responsive to each of said units being in the idle condition, and to advance said connection one level with the operation of one of said relays in said group.

8. In an allotter system for assigning different groups of switching units for use in accordance with the relative number of units therein which are in a predetermined condition, a traffic distributor means for each group including a plurality of marking levels for indicating over at least certain ones thereof the number of units in the group associated therewith which are in said condition; signal means for each unit operative to indicate the operation thereof to said condition; a first set of marking means operatively controlled by said signal means for its associated units to establish a signal on each of said certain levels responsive to none of the units in its associated group being in said predetermined condition and for advancing the marking signals one level responsive to each operation of a unit of its group to said predetermined condition; a plurality of multiple members, each of which multiple members interconnects a preassigned one of said certain levels in each of the different traffic distributor means, different multiple members interconnecting different levels, whereby the signal markings on said different levels are coupled to said plurality of multiple means to indicate thereon the total number of units in said predetermined condition in the one of the groups having the smallest number of units in said condition; test conductors connected in each unit to indicate the idle and busy condition thereof to associated selection equipment; readout means connected to the test conductor for each unit; and a second set of marking means in each traffic distributor means controlled by said signal therefor to connect said readout means at least one level below said certain levels with none of its associated units in said condition and to advance same one level with each operation of one of its associated units to said condition, whereby a marking signal placed by the marking means of one of the traffic distributor means on the level to which the readout means of another traffic distributor means is connected, is extended directly to the test conductor of the other traffic distributor means to render same artificially busy to the associated equipment.

9. An allotter system as set forth in claim 8 in which each of said switching units is a recorder unit in a telephone exchange, and which includes means for connecting said test conductors to selector switches which are connected to have access to said recorder units.

10. An allotter system as set forth in claim 8 which includes a plurality of control units, each of which is connected in common to the switching units of a group, and including means in each of said control units operative to disconnect the traffic distributor means for its group from said multiple means and to connect signals over said levels of its group to the readout means and test conductors connected thereto.

References Cited in the file of this patent

UNITED STATES PATENTS

| | | |
|---|---|---|
| 2,232,371 | Dehn | Feb. 18, 1941 |
| 2,421,919 | Avery | June 10, 1947 |
| 2,574,903 | Bellamy | Nov. 13, 1951 |